Figure 1:
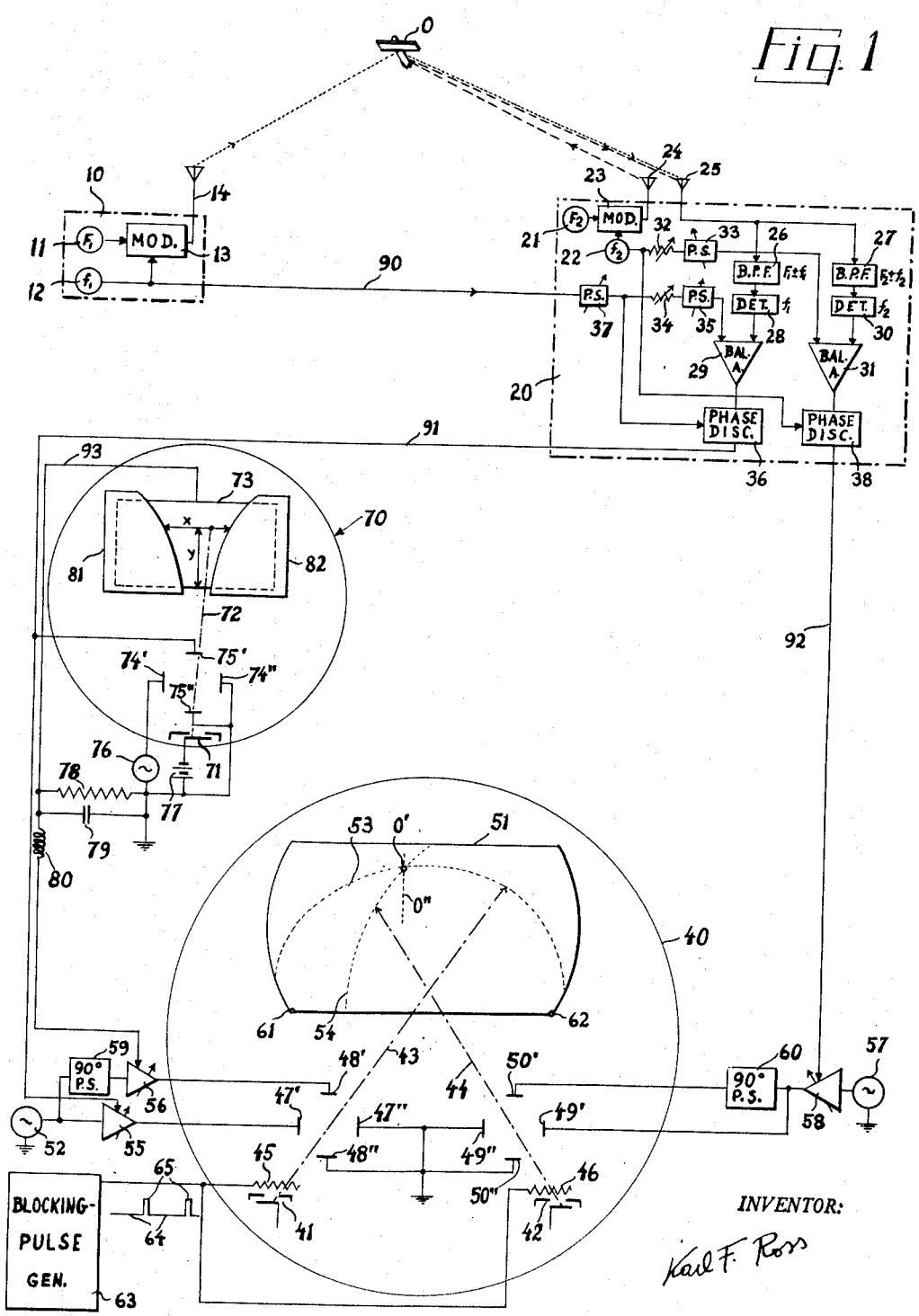

INVENTOR:
Karl F. Ross

INVENTOR:
Karl F. Ross

United States Patent Office 2,920,320
Patented Jan. 5, 1960

2,920,320

RADIOLOCATION SYSTEM

Karl F. Ross, New York, N.Y.

Application December 3, 1954, Serial No. 472,793

14 Claims. (Cl. 343—12)

My present invention relates to a system for detecting the presence of intruding objects, notably aircraft, by means of electromagnetic waves.

Known types of radio detection systems, commonly known as "radar," utilize the echo of discrete pulses of ultra-high-frequency energy to determine the distance of an object from an observation point and the direction in which the object is located. A known drawback of such systems is that the same will operate only over relatively large distances, i.e. over distances for which the back-and-forth travel time of the pulse exceeds to an appreciable extent its necessary duration. For the same reason it is difficult for conventional radar apparatus to detect low-flying ("hedge-hopping") aircraft, inasmuch as at the distance referred to the craft will be in the shadow of the earth's curvature.

The principal object of this invention is to provide a radio detection system adapted to indicate the presence of a wave-reflecting intruder at short range and low altitudes.

An ancillary object of my invention is to provide apparatus for visually indicating at least the approximate location of an object by the intersection of two luminous traces on a fluorescent screen or the like.

A feature of my present invention resides in the provision of means for detecting a vectorial change in the transmitted wave energy as received after reflection from surrounding objects. This can be readily accomplished by supplying a reference wave from the transmission point to the reception point over a path substantially independent of the presence or absence of reflecting objects, such as a metallic circuit or a low-frequency carrier wave. A portion of the reference wave, suitably adjusted in phase and amplitude, is preferably utilized to balance the direct transmission and the background echo, i.e. the reflected wave normally returned to the system from its surroundings. If the reflecting characteristics of the surroundings are altered by the appearance of an intruding object, the reflected wave acquires a new component whose phase relation to the reference wave can be determined by a comparison circuit or discriminator and will be a measure of the distance of the object, assuming that the waves to be compared have a length which is large with respect to said distance. Since, however, such relatively long waves are not normally reflected by a comparatively small object, it will be necessary to modulate them upon a carrier whose own wavelength is small in relation to the dimensions of the object to be detected.

If the transmitting and receiving antennas are located close to each other, the distance measured by the phase discriminator will substantially equal the radius of a sphere upon whose surface the reflecting object may be found. If the two antennas are spaced far apart, the sphere turns into an ellipsoid. For a visual indication of the approximate location of the object on a fluorescent screen it will usually be sufficient to take an axial section of either of these bodies, i.e. a circle or an ellipse, and by the use of two transmitters and/or two receivers it is possible to project two such traces upon a screen and to ascertain said location as the point of intersection of the two conic sections. Making visible this point of intersection involves, according to another feature of my invention, the use of two cathode ray beams each by itself adapted to excite the screen only to a state of low or even subvisible luminosity, whereby only the simultaneous or immediately consecutive excitation of a single spot by both beams will result in a clearly visible mark.

Figure 2:
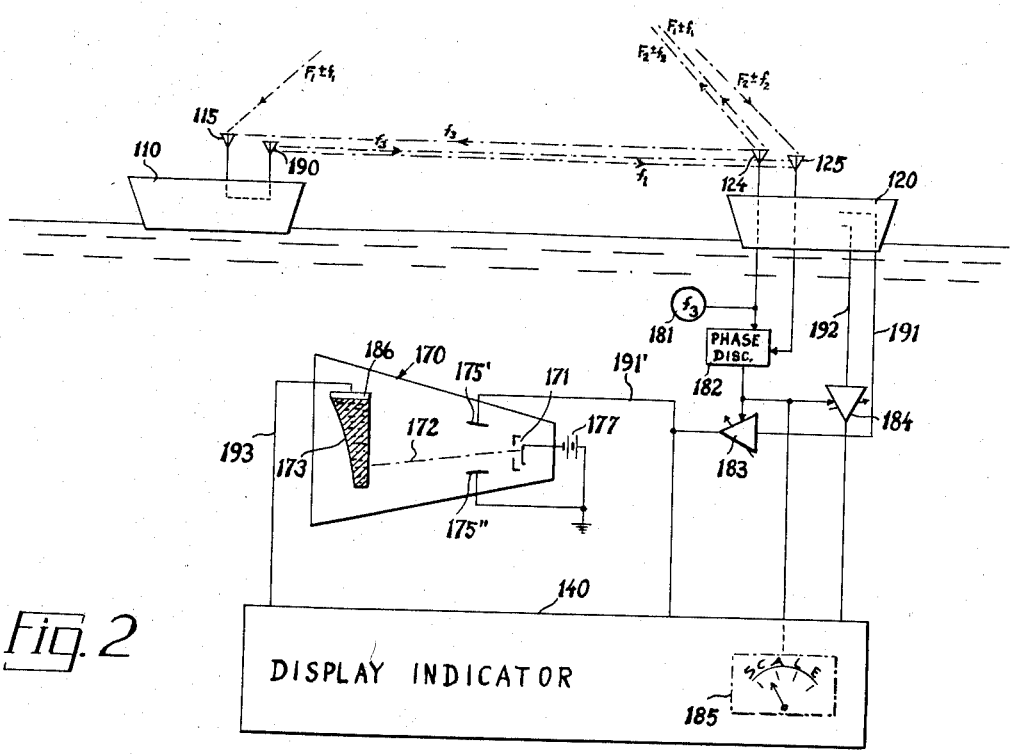
Figure 3:
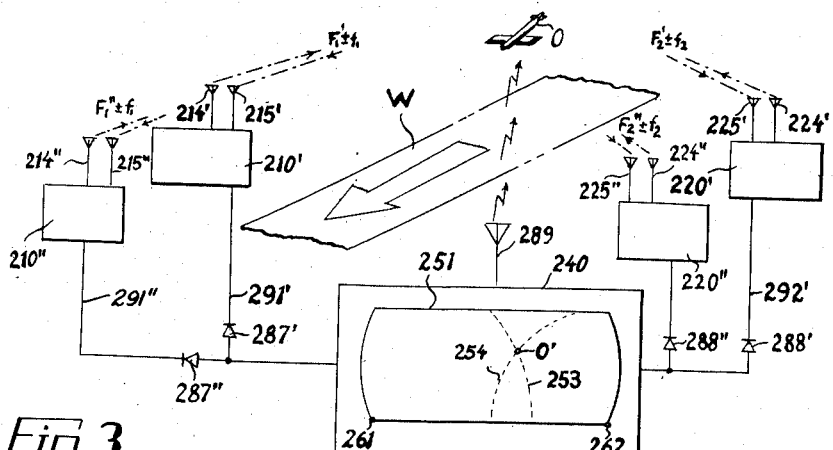

The above and other objects and features of my invention will become more fully apparent from the following detailed description, reference being had to the accompanying drawing wherein Figs. 1, 2 and 3 represent schematic illustrations of three embodiments.

In Fig. 1 there are shown two geographically separated radio stations 10 and 20. Station 10 comprises a source 11 of carrier waves having a high frequency $F_1$, a source 12 of modulating waves having a lower frequency $f_1$, both of these sources working into a modulator 13, and a transmitting antenna 14 energized from the output of modulator 13. The output $f_1$ of source 12 is also transmitted to station 20 over a metallic circuit comprising a transmission line 90.

Station 20 similarly comprises a source 21 of carrier waves having a high frequency $F_2$, a source 22 of modulating waves having a lower frequency $f_2$, both of these sources working into a modulator 23, and a transmitting antenna 24 energized from the output of modulator 23.

The wavelengths of the outputs of sources 11 and 21 should be short compared with the dimensions of an object O, e.g. an airplane, to be detected by the system. The wavelengths of the outputs 12 and 22, on the other hand, should be greater than the operating range of the system, which may be several times the distance of stations 10 and 20.

A receiving antenna 25 at station 20 works into a bandpass filter 26, tuned to the frequency range $F_1 \pm f_1$ so as to accommodate the carrier and the sidebands radiated by antenna 14, and in parallel therewith into a similar filter 27, tuned to the frequency range $F_2 \pm f_2$ to accommodate the carrier and the sidebands radiated by antenna 24. A detector 28 recovers the modulating frequency $f_1$ from the output of filter 26 and feeds it to one input of a balanced amplifier 29.

Part of the output of source 12, after transmission over line 90 and adjustment in amplitude and phase by means schematically illustrated as a variable resistor 34 and a phase shifter 35, is applied to another input of amplifier 29 in such manner that the output of this amplifier is zero in response to wave energy due to direct transmission and background reflection normally passing through filter 26. Another detector 30 recovers the modulating frequency $f_2$ from the output of filter 27 and feeds it to one input of another balanced amplifier 31. Part of the output of source 22 is also adjusted by means of a variable resistor 32 and a phase shifter 33, after which it is applied to another input of amplifier 31 so as to compensate the wave energy normally passing through filter 27.

When the aforementioned background reflection and direct transmission are supplemented by reflection from a transient object, such as the airplane O, an output will appear at each of the two balanced amplifiers 29, 31. The output of amplifier 29, of frequency $f_1$, is fed to a phase discriminator 36 which also receives the same frequency directly from source 12 via transmission line 90; the latter includes a phase shifter 37 to cancel the phase shift in the line between stations 10 and 20. The output of amplifier 31, of frequency $f_2$, is fed to a phase discriminator 38 which is also connected directly to source 22. These phase discriminators may be, for example, of the type disclosed in my Patent No. 2,557,038, issued June 12, 1951.

It can be readily shown that the object O is found on a circle, centered on a line interconnecting stations 10 and 20, which is the locus of intersection of an ellipsoid, whose foci are the antennas 14 and 25, with an ellipsoid whose foci are the antennas 24, 25 and which practically is a sphere. The major axis $2a$ of the first-mentioned ellipsoid and the diameter $2R$ of the sphere are directly proportional to the phase differences measured by discriminators 36 and 38 respectively.

Thus, the outputs of discriminators 36 and 38 may now be utilized for the purpose of projecting upon a screen an ellipse and a circle, or portions thereof, proportionally representing axial sections of the two spheroidal bodies referred to. The ellipse can be plotted since its major axis $2a = 2kA$ and its focal distance $2e = 2kE$ are known, $k$ being the scale factor of the projection screen and $2E$ being the fixed (or determinable) spacing between the two stations 10 and 20. The minor axis $2b$ of the ellipse is then given by the formula $b = \sqrt{a^2 - e^2}$. The circle is simply defined by its radius $r = kR$.

At 40 I have schematically indicated a cathode ray tube having two electron guns 41, 42 giving rise to a pair of beams 43, 44 whose intensity is controlled by respective grids 45, 46. Beam 43 passes between a pair of horizontal deflecting electrodes 47', 47'' and a pair of vertical deflecting electrodes 48', 48''. Beam 44 similarly passes between a pair of horizontal deflecting electrodes 49', 49'' and a pair of vertical deflecting electrodes 50', 50''. A fluorescent screen 51 is positioned in the path of both beams.

In order that the trace 53 of beam 43 may conform to part of an ellipse having the parameters previously set forth, it is necessary that deflecting voltages of the form $ma \cdot \cos \omega_1 t$ and $mb \cdot \sin \omega_1 t$ be respectively applied to the electrodes 47', 47'' and 48', 48'', $m$ being a proportionality factor and $\omega_1$ being the pulsatance of a source of sweep voltages diagrammatically indicated as an oscillator 52. This is accomplished by feeding the output of oscillator 52 to the electrodes 47', 47'' by way of amplifier 55 whose gain is directly controlled by the output of phase discriminator 36 via a lead 91, and to the electrodes 48', 48'' by way of an amplifier 56 whose gain is controlled by the output of the same discriminator through the intermediary of a translator 70. The trace 54 of beam 44 is caused to represent an arc of a circle of the desired diameter by feeding the output of another oscillator 57, of pulsatance $\omega_2$, to the electrodes 49', 49'' and 50', 50'' by way of an amplifier 58 whose gain is controlled by the output of discriminator 38 via a lead 92. 90° phase shifters 59, 60 are inserted between the oscillators 52, 57 and the respective vertical electrodes 48', 50'. The pulsatances $\omega_1$ and $\omega_2$ are preferably of the same order of magnitude but need not be identical.

The point of intersection O' between traces 53 and 54 indicates the position of a vertical plane O'' in which the object O is located with respect to the stations 10 and 20, the latter being represented on the screen 51 by the lower corners 61 and 62 thereof. It should be noted that the elevation of point O' above the base line 61–62 does not necessarily correspond to the height of object O above the level of stations 10 and 20, said elevation being a measure of this height only at the moment when the object is directly above a straight line connecting the two stations; at other times the screen 51 shows an elevation which, being the radius of the circle of intersection between the two aforementioned spheroids, is greater than the actual height. While the precise position of the object could be graphically ascertained from the intersection of such circle with a similar circle derived from another pair of stations identical with the ones herein disclosed and located on a line parallel thereto (e.g. as in the array of Fig. 3), such determination will usually not be necessary in a monitoring system of this character. It should also be noted, in this connection, that the presence of two or more objects will cause the system to show only a single point of intersection O' representing the approximate geometrical center of the group. It will, therefore, be desirable to limit the sensitivity threshold of the system so as to make it substantially non-responsive to objects lying beyond the range encompassed by the screen 51, whereby the influence of distant objects upon the image appearing on the screen will be minimized; this can be readily accomplished, for example, by suitably biasing the balanced amplifiers 29 and 31.

Since the shifting of the traces 53 and 54 over the screen 51 may make it unduly difficult to locate the point of intersection O' in the case of of a rapidly moving object, it is desirable to reduce the brightness of these traces substantially below that of said point, preferably beyond the limit of visibility. I have shown for this purpose a pulse generator 63 applying a train of relatively long blocking pulses 64, alternating with relatively short unblocking pulses 65, to the grids 45 and 46 of tube 40. For proper operation it is necessary that the fluorescent screen 51 have a period of residual excitation (afterglow) which is large compared to the duration of unblocking pulses 65 (or to the spacing between blocking pulses 64) but small compared to the duration of blocking pulses 64 (or to the spacing between unblocking pulses 65), and that the intensity of beams 43, 44 during each unblocking period be such that each beam by itself will be unable to excite the screen during such period beyond a state of low or sub-visible luminosity but that both beams together will produce a clearly visible spot at the point where the two traces intersect. For this purpose it is preferable to make the duration of each pulse 65 not greater than a single cycle of oscillators 52 and 57; otherwise it would be necessary to make the thickness of each trace large with respect to the distance by which the trace could possibly shift during any unblocking period. If, finally, the length of each blocking period or pulse 64 is made less than the time of visual persistence of the human retina, as would be the case with a pulse cadence of the order of 20 cycles per second or higher, then the path of an object O will appear (subject to the qualifications previously set forth) as a luminous streak on the screen 51.

The translator 70 shown in the drawing comprises another cathode ray tube having an electron gun 71 whence a beam 72 is emitted toward a target electrode 73, a pair of horizontal deflecting electrodes 74', 74'' and a pair of vertical deflecting electrodes 75', 75''. A high-frequency oscillator 76 is connected across the horizontal electrodes 74', 74''; the output of discriminator 36 is impressed upon the vertical electrode 75', its companion electrode 75'' being grounded. The cathode of electron gun 71 is connected to the negative terminal of a battery 77, and the target electrode 73 is returned to the grounded positive terminal of that battery by way of a resistor 78 shunted by a condenser 79, these elements forming part of a smoothing network also including an inductance 80 inserted in the lead 93 which extends from electrode 73 to amplifier 56.

The translator 70 further comprises a pair of shields 81, 82 which partially cover the target electrode 73 and whose contours are such that $x = \sqrt{y^2 - e^2}$, $y$ being the elevation of beam 72 from a reference line at the point where it strikes the target 73 under the control of discriminator 36, $x$ being the spacing of shields 81, 82 at such elevation. This translator produces a series of current impulses, of an amplitude proportional to $x$, which are integrated by the network 78, 79, 80 to deliver the desired control voltage to amplifier 56.

In Fig. 2 I have shown a system similar to that of Fig. 1 but adapted for use with installations where the distance between the two stations is not fixed, as where either or both stations are on board of ships or aircraft. Fig. 2 shows a pair of floating stations 110, 120 of which only the master station 120 is provided with means for producing modulated carrier waves and detecting their envelopes in the manner illustrated in Fig. 1. Thus, the first carrier $F_1 \pm f_1$ is radiated by transmitting antenna 124 of station 120 and received, after reflection at an object not shown, by antenna 115 of station 110, whence it is retransmitted by an antenna 190 at the latter station toward receiving antenna 125 of station 120. The second carrier $F_2 \pm f_2$, transmitted by antenna 124, is received after reflection, by antenna 125. The leads 191 and 192 extending from station 120 toward the display indicator 140 and toward translator 170, as well as the lead 193 extending from the translator toward the indicator, correspond to leads 91, 92 and 93 of Fig. 1. It will be understood that these leads will be physical conductors only where the associated circuits such as 170, 140 are located on board of the floating station 120; they could, on the other hand, also be representative of radio links leading to a control station on land or on some other vessel.

A generator 181 of a frequency $f_3$ is connected to transmitting antenna 124 which radiates this frequency to antenna 115 at station 110. This frequency is reradiated to station 120 by antenna 190, along with frequency $f_1$. Inasmuch as both of these frequencies represent relatively long waves, their phases are not materially affected by reflections from ships or aircraft. It will, of course, be understood that a carrier of some intermediate frequency may be used for waves $f_1$ and $f_3$ if the latter are too long for efficient direct transmission, bearing in mind that the length of these waves should be large with respect to the spacing between stations 110, 120.

Frequency source 181 and receiving antenna 125 work into a phase discriminator 182 whose output is a measure of the phase shift of wave $f_3$ on its passage from station 120 to station 110 and back; thus, this output represents also a measure of the distance between the two stations. Any increase in this distance will increase the phase shift of wave $f_1$, as measured by the discriminator 36 (Fig. 1), thus seemingly lengthening the parameters of the ellipse 53. Also, since the spacing of the reference points 61, 62 on the screen 51 (Fig. 1) is fixed, an increase in the actual distance between the stations represented by these reference points increases the scale ratio of the display indicator, thereby necessitating further reduction of the axes of ellipse 53 as well as a decrease in the radius of circle 54. For these reasons there has been inserted an amplifier 183 in lead 191 and a similar amplifier 184 in lead 192, both of these amplifiers being controlled by the output of discriminator 182 to modify the control voltages transmitted over these leads in a manner compensating for the changes referred to. The output of discriminator 182 is also applied to a scale indicator 185 in display indicator 140.

It may be mentioned at this point that the single transmitting and receiving antennas shown in the drawing may, of course, be representative of a plurality of antennas adapted for different frequencies, and that certain of these antennas may be directive to minimize direct transmission between the two stations. Even so, part of the energy of frequency $f_1$ returned to station 120 may be derived from a directly transmitted component of carrier $F_1 \pm f_1$, this part being included in the background energy to be compensated by the arrangement 34, 35, 29 of Fig. 1. Since in Fig. 2 the compensating energy is derived from the wave $f_1$ as transmitted by antenna 190 which replaces the transmission line 90 of Fig. 1, and since both this compensating energy and the aforementioned directly transmitted component vary inversely with the inter-station spacing, compensation may remain substantially unaffected by changes in the distance between the stations. If necessary, proper adjustments can readily be made by means of the variable elements 34, 35, e.g. by observing the output of discriminator 182 or automatically under the control of this output as measured by scale indicator 185.

The translator 170 of Fig. 2 differs from the device 70 of Fig. 1 in that the horizontal deflection electrodes of the latter have been omitted along with the shields 81, 82, the target electrode 173 itself having been modified to incorporate an electron barrier in the form of a body of electric resistance material so shaped that its series resistance varies as the function $b(a)$ of its effective length, i.e. of the distance from a collector electrode at which it is struck by an electron ray 172. This ray, emitted by a gun 171 which is energized by a battery 177, passes between vertical deflection electrodes 175', 175" of which the former is connected to lead 191' and the latter is grounded, lead 191' representing a continuation of lead 191 beyond amplifier 183. A metallic coating 186 in contact with electrode body 173 represents the collector electrode, the current through this electrode varying with the deflection of the ray under the control of the output of amplifier 183. Thus again, with proper shaping of the target 173, there is produced an output voltage or current as a non-linear (e.g. elliptical) function of an input voltage or current, the output electrical variable so produced being applied to indicator 140 by lead 193 connected to electrode 186.

In Fig. 3 I have shown the application of my invention to a radio beacon system for airplanes. A plurality of pairs of stations 210', 220' and 210", 220" (only two pairs shown) are positioned on opposite sides of a runway W on which an aircraft, again designated O, is about to come down. Station 210' (or 210") has a transmitting antenna 214' (or 214") and a receiving antenna 215' (or 215") operating on the modulated carrier wave $F_1' \pm f_1$ (or $F_1'' \pm f_1$); station 220' (or 220") similarly has a transmitting antenna 224' (or 224") and a receiving antenna 225' (or 225") operating on the modulated carrier wave $F_2' \pm f_2$ (or $F_2'' \pm f_2$). The reflected energy of each station, preferably after compensation of background energy by means such as shown at 32, 33, 27 (Fig. 1), is applied to a display indicator 240 via leads 291', 291" and 292', 292". A selector circuit, here shown schematically as comprising rectifiers 287', 287" and 288', 288" in leads 291', 291" and 292', 292" respectively, makes the indicator responsive only to the output of that pair of stations (e.g. 210', 220') for which the phase displacement between outgoing and reflected waves is at a minimum, thus indicating the closest proximity to the object O; for example, the rectifiers have been shown poled so as to select the most negative potential from each lead multiple, assumed to be the potential of conductors 287' and 288', for application to the indicator. These potentials give rise to a pair of circular traces 253, 254, intersecting at O', on the screen 251 on which the runway W is represented by the base line interconnecting reference points 261, 262. For reasons previously pointed out, the elevation of point O' above this base line corresponds to the true height of the airplane O at the instant when the latter passes between the controlling stations (e.g. 210', 210"), hence with a sufficiently close spacing of the several pairs of stations along runway W the point O' will indicate with good approximation the position of the airplane above ground. The point O' can again be made distinctly visible by the means previously described.

An antenna 289 at the control station, represented by indicator 240, serves as a means for transmitting to the airplane O a combination of signals to enable the visual reproduction of the traces 253, 254 on a screen similar to element 251 on board of the craft.

Although in Fig. 3 I have shown the spot O' to be produced by the intersection of circular traces derived from a pair of stations each similar to the station 20 of Fig. 1, it will be understood that an arrangement using elliptical traces, as previously described, may also be utilized. Such an arrangement would, in fact, be more desirable where the system is to be used for guiding a craft completely down to its landing strip, since in the neighborhood of the base line the point of intersection between an ellipse and a circle (Fig. 1) will be more sharply defined than that between two circles (Fig. 3).

Thus, it will be appreciated that the embodiments herein disclosed are suggestive of numerous modifications, cross-combinations and adaptations which I consider part of my invention and intend to include in the scope of equivalents of the appended claims.

I claim:

1. In a radio detection system, in combination, transmitting antenna means for sending out a first and a second carrier wave of high-frequency energy amplitude-modulated with a first and a second signal wave respectively, receiving antenna means for intercepting reflections of said first and second waves, at least one of said antenna means including a pair of geographically spaced antennas for said first and said second wave respectively, comparison circuit means connected to said receiving antenna means, a wave source connected to said transmitting antenna means for supplying said first and second modulated carrier waves thereto, link means forming a path substantially independent from reflecting objects between said source and said comparison circuit means for supplying the latter with reference wave energy in predetermined phase relationship with said first and second signal waves as sent out by said transmitting antenna means, phase discriminator means in said comparison circuit means for determining the phase displacement between received wave energy and said reference wave energy, and means for indicating the magnitude of said phase displacement for each of said signal waves, whereby at least the approximate position of a reflecting object may be determined from the intersection of two substantially spheroidal bodies having focal points at the locations of said transmitting and receiving antenna means, the parameters of said bodies being mathematically determinable from the magnitude of said phase displacement, the wavelengths of said carrier waves being of an order not greater than that of the dimensions of an object to be detected, the wavelengths of said signal waves being of an order not less than that of the distance between said geographically spaced antennas, said comparison circuit means including balancing means and means for supplying wave energy from said wave source to said balancing means for canceling out direct transmission and normal background reflection prior to application of received wave energy to said phase discriminator means.

2. The combination according to claim 1, wherein said link means comprises means for transmitting wave energy in phase with said first and second signal waves to said phase discriminator means, said comparison circuit means including detector means for applying wave energy in phase with the envelope of received carrier waves to said phase discriminator means.

3. The combination according to claim 1, including fluorescent screen means, means for directing a first and a second electron beam toward said screen means, sweep means controlled by said magnitude-indicating means for deflecting said beams across said screen means along paths representing at least portions of axial sections of respective ones of said spheroids, and means for indicating the positions of said antenna means relative to the point of intersection of said paths.

4. The combination according to claim 3, further comprising means for substantially simultaneously unblocking said beams for relatively short periods separated by relatively long blocking intervals, said fluorescent screen means comprising a single screen for both beams excitable by either one of said beams only to a state of substantially less than maximum luminosity within any of said short unblocking periods, the time of persistence of excitation of said screen being long compared to said unblocking periods but short compared to said blocking intervals.

5. A device for visually indicating the position of an object by the intersection of two loci, comprising a fluorescent screen, means for directing a first and a second electron beam toward said screen, sweep means for deflecting said beams along paths representing at least portions of said loci, and beam control means for substantially simultaneously unblocking said beams for relatively short periods separated by relatively long blocking intervals, said screen being excitable by either one of said beams only to a state of substantially less than maximum luminosity within any of said short unblocking periods, the time of persistence of excitation of said screen being long compared to said unblocking periods but short compared to said blocking intervals.

6. A device according to claim 5, wherein said beam control means is arranged to unblock each of said beams for only a period insufficient to enable excitation of said screen to a state of visible luminosity except in response to electron energy from both of said beams converging upon a single spot.

7. A device according to claim 6, wherein said sweep means comprises a source of oscillations, said control means being arranged to unblock each of said beams for a period of the order of not more than a single oscillatory cycle of said source.

8. A device according to claim 5, wherein said beam control means is arranged to unblock each of said beams at a rate of the order of at least twenty times per second.

9. In a radio detection system, in combination, a pair of geographically spaced stations, wave-translating means including at least one antenna at each of said stations for transmitting a first and a second high-frequency carrier wave amplitude-modulated with a first and a second signal wave, respectively, and receiving reflections thereof over different paths, the wavelengths of said carrier waves being of an order not greater than that of the dimensions of an object to be detected, the wavelengths of said signal waves being of an order not less than that of the distance between said stations, circuit means connected to said wave-translating means for determining the phase relationship between transmitted and received signal wave energy, said circuit means including balancing means supplied with signal wave energy over a substantially reflection-independent path for canceling out direct transmission and normal background reflection in said received signal wave energy, and means for indicating said phase relationship as a measure of the parameters of two substantially spheroidal bodies upon the surfaces of which a reflecting object is located.

10. The combination according to claim 9, wherein said stations are relatively movable, further including a source of a third wave at one of said stations, means at said one of said stations for transmitting said third wave to the other of said stations, means at said other of said stations for receiving said third wave, phase discriminator means, means for applying energy of said third wave from said other of said stations and from said source to said phase discriminator means, and means for translating the output of said phase discriminator means into an indication of the relative distance of said stations.

11. In a radio detection system, in combination, a plurality of pairs of geographically spaced stations, respective wave-translating means at each of said pairs including at least one antenna at each station of the respective pair for transmitting a first and a second high-frequency wave and receiving reflections thereof over different paths, a plurality of phase-discriminating means respectively connected to said wave-translating means for determining the phase relationship of the wave energy transmitted and received at each of said pairs of stations, circuit means for selecting among the respective outputs of said plurality of discriminating means the output produced by the phase relationship indicating closest proximity of a reflecting object to one of said pairs of stations, and means controlled by said circuit means for visually indicating at least the approximate elevation of said object above ground as the intersection of two conic sections each representative of a spheroidal body having a focus at a respective one of the stations of said one of said pairs.

12. In combination, a cathode ray tube including means for producing an electron beam and circuit means for deflecting said beam along an elliptical path, said circuit means comprising a generator of sinusoidal oscillations, first sweep means for deflecting said beam in one dimension, second sweep means for deflecting said beam in another dimension, means for impressing the output of said generator with a 90° phase difference upon said first and second sweep means, first sweep control means connected to said first sweep means for controlling the amplitude of deflection in said one dimension, second sweep control means connected to said second sweep means for controlling the amplitude of deflection in said other dimension, a source of a first control variable connected to said first sweep control means for adjusting the beam swing in said one dimension to a value corresponding to one of the axes of said elliptical path, a source of a second control variable connected to said second sweep control means for adjusting the beam sweep in said other dimension to a value corresponding to the other of the axes of said elliptical path, and translator means connected between said sources for converting one of said variables into the other in accordance with the ratio of said axes, said ratio being different from unity; said translator means comprising means for producing an electron ray, means for deflecting said ray under the control of said first variable, and target electrode means in the path of said ray converting electron energy of said ray into an electrical output varying, as an elliptical function of distance, with the locus of impingement of said ray upon said electrode means.

13. A radio navigation system for guiding aircraft above a runway, comprising a plurality of radiowave-translating stations including several first stations and a like number of second stations positioned in pairs on opposite sides of successive sections of said runway, wave-reflection-controlled means responsive to high-frequency wave energy, transmitted between an aircraft and said stations, for deriving from the output of said first and second stations first and second electrical variables respectively representative of the spacing of said aircraft from said first and second stations, circuit means for selecting a variable of maximum magnitude among said first variables and a variable of maximum magnitude among said second variables, the variables thus selected being derived from the outputs of the two opposite stations closest to said aircraft, and means controlled by said circuit means for converting said selected variables into an indication of distance of the aircarft from a line interconnecting said closest two station, said indication serving as an approximate measure of the height of the aircraft above said runway.

14. A system according to claim 13, wherein said wave-reflection-controlled means comprises means for determining an elliptical locus of the position of said aircraft with the two stations of a pair as focal points by radiating wave energy from one station and receiving wave energy at the other station of the pair, and means for determining a circular locus, intersecting said elliptical locus, of the position of said aircraft by radiating wave energy from one station of the pair and receiving reflected wave energy at the last-mentioned station.

References Cited in the file of this patent

UNITED STATES PATENTS

| | | |
|---|---|---|
| 2,374,666 | Cunniff | May 1, 1945 |
| 2,427,219 | Luck | Sept. 9, 1947 |
| 2,515,332 | Budenbom | July 18, 1950 |
| 2,545,123 | Tolson | Mar. 13, 1951 |
| 2,649,542 | Glass | Aug. 18, 1953 |
| 2,654,084 | Wilkie | Sept. 29, 1953 |